Jan. 3, 1950 H. E. DURKEE 2,493,574
LATHE WORK DRIVER
Filed June 13, 1946
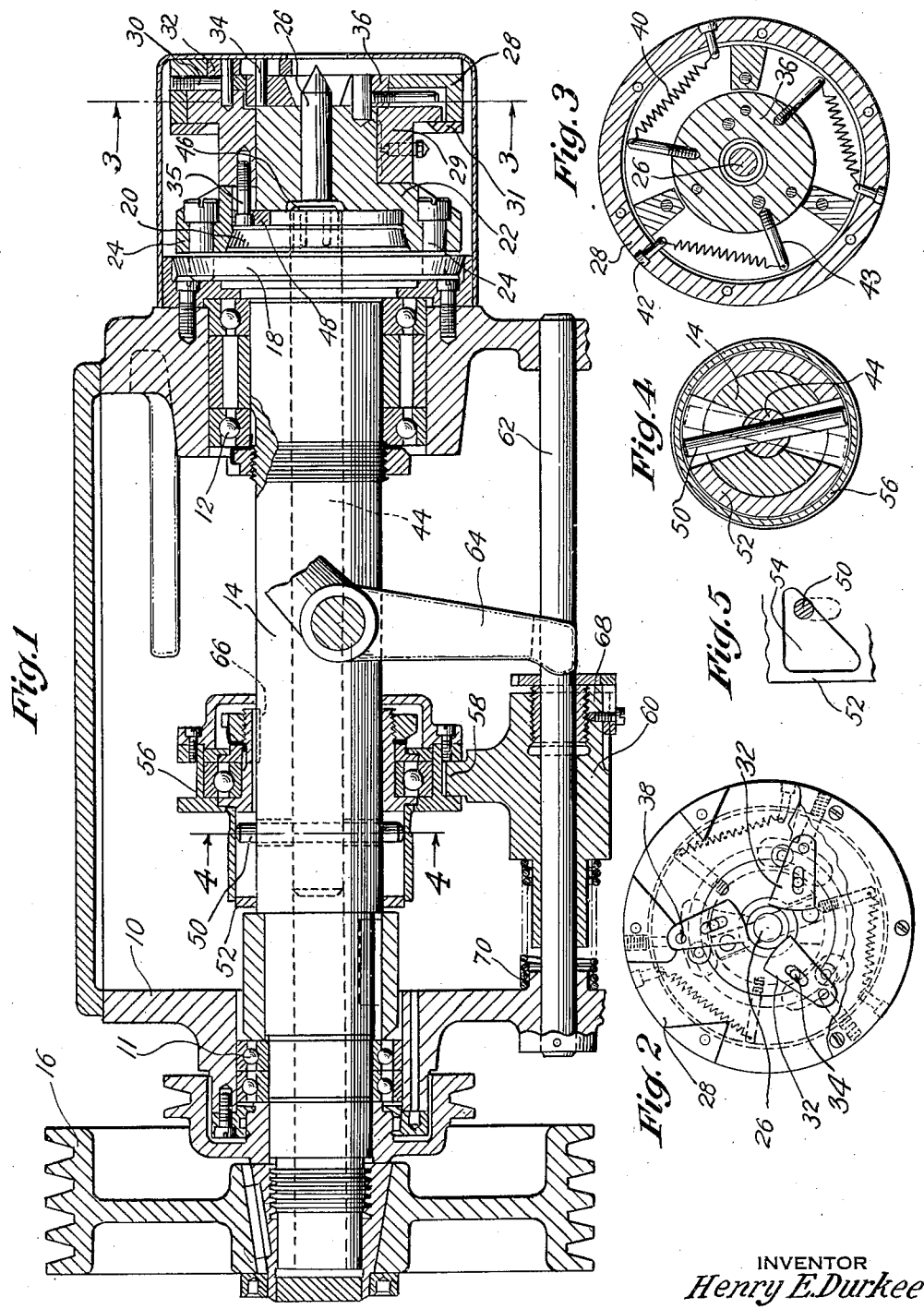
INVENTOR
Henry E. Durkee
BY
Joseph H. Schofield
ATTORNEY

Patented Jan. 3, 1950

2,493,574

UNITED STATES PATENT OFFICE 2,493,574

LATHE WORK DRIVER

Henry E. Durkee, Manchester, Conn., assignor to Niles-Bement-Pond Company, West Hartford, Conn., a corporation of New Jersey Application June 13, 1946, Serial No. 676,506

3 Claims. (Cl. 82—40)

This invention relates to work drivers and particularly to a floating or radially adjustable work driver adapted for application to automatic lathes to rotate a work piece while supported on fixed centers.

An object of the invention is to provide a simple, rugged and efficient work driver for automatic lathes that will enable a work piece to be supported and rotated upon the axis of a pair of fixed centers, work driving jaws being normally forced into work engaging position to drive the work while supported on the axis of these centers.

Another object of the invention is to provide improved means to move the work engaging members to their retracted or work releasing positions so that the work pieces may be removed from or allowed to fall from the lathe.

A feature that enables the above objects to be accomplished is that the work engaging members are adapted for oscillation within the driving means or chuck about suitably mounted pivots, there being an actuating member for oscillating them to their work releasing positions, springs being provided to normally hold these members toward their work engaging positions.

Another feature of importance is that the work engaging members are moved to their releasing positions by rotational movement of a bar or rod extending longitudinally and centrally within the spindle which may be actuated manually or by power by an axially movable sleeve at definite periods of the cycle of operation of the machine.

With the above and other objects in view, the invention consists in the features of construction and operation set forth in the following specification and illustrated in the accompanying drawing.

In the drawing:

Figure 1 is a longitudinal sectional view of a lathe headstock and spindle equipped with what is now deemed to be a preferred embodiment of the invention.

Fig. 2 is an end view taken from the right-hand end of the work driver as shown in Fig. 1, the cover head being removed to more clearly show the constructional features of the work drivers.

Fig. 3 is a cross sectional view taken on the plane of line 3—3 of Fig. 1 and looking in the direction of the arrows.

Fig. 4 is a cross sectional view taken upon the plane of line 4—4 of Fig. 1, and Fig. 5 is a fragmentary detail showing the form of openings provided in the actuator member for moving the work engaging members to their work releasing positions.

In its broadest aspect, the invention may include the following principal parts: First, a spindle rotatably supported within a suitable headstock, preferably upon anti-friction bearings; second, a chuck body member mounted in fixed position on one end of the spindle and having a center mounted therein; third, three work engaging members pivotally mounted within the forward portion of the chuck; fourth, supporting means for said work engaging members mounted for limited floating movement relative to the chuck body member; fifth, actuating means for pivotally moving the work engaging members including an oscillating member rotatable relative to and upon the body member and adapted to move the work engaging members into and out of their work engaging positions; sixth, an elongated member extending axially within the spindle and having a splined engagement with the oscillating member; seventh, a transverse member secured within the elongated member and passing through slots formed in the spindle, the transverse member extending beyond the outer diameter of the spindle; eighth, an axially slidable member splined to the spindle and having oblique surfaces bearing against the transverse pin for oscillating the axially extending member; and ninth, means to move this slidable member axially of the spindle.

Referring more in detail to the figures of the drawings, there is shown in Fig. 1 a headstock 10 having suitably alined bearings 11 and 12 formed therein, preferably of the anti-friction type, and rotatably supporting an elongated spindle 14 upon a fixed horizontal axis. The spindle 14 at one end is provided with a driving pulley 16 and at its opposite end may have an integral flange 18 thereupon and a conical projection 20 over which is detachably mounted the body member 22 of a work chuck. As shown in Fig. 1, the chuck body member 22 is held in fixed position relative to the spindle 14 by being held against the projection 20 and flange 18 by means of suitable screws 24. Extending within this body member 22 is a fixed center 26 rotating with the body member 22 and spindle 14. It will be seen from the above that a work piece suitably centered may be supported at one end upon the center 26 in the usual manner and may be rotated on a fixed axis with the spindle 14 by means presently to be described. The opposite end of the work piece may be supported in the usual manner on a center in a tailstock (not shown).

Adjacent the outer end of the body member 22 is a ring member 28 held against the outer face of the chuck operating sleeve 29 by means of an annular member 31. This ring 28 is provided with studs 30 engaging within radial recesses formed in the sleeve 29 and large enough to permit limited floating movement transversely of this member relative to the axis of the spindle.

In order to drive the work while being supported upon the center 26, three work engaging members 32 having cam surfaces at their inner or work engaging ends are adapted to contact the outer surface of the work piece. Each of the members 32, as indicated in Fig. 2, has its outer end bearing against the driving ring 28 and is provided with an intermediate slot engaging a pin 34 provided within a driving ring 36. The pivotal connection at the outer end of the members 32 is about a pin 38 housed within the driving ring 28 rotatably mounted for slight angular movement relative to the body member.

In order to hold these work engaging members 32 in their work engaging positions, springs 40 are provided extending from pins 42 inserted within the outer ring or driver 28 of the chuck forming part of the actuating member. At their opposite ends these springs 40 engage pins 43 extending radially from the driving member 36 within the chuck.

In order to effect angular displacement of this actuating member 36 relative to the spindle 14 and body portion 22, an elongated member 44 extends partially through the spindle axially and centrally thereof and at its chuck end is provided with a plurality of splines. These splines 46 engage corresponding splines formed in a member 48 attached to the sleeve 29 for the actuating member 36 by one or more pins or screws 35. Thus relative angular movement of the elongated member 44 and spindle 14 will correspondingly move the actuating member 36 and the sleeve 29 to which the work engaging members 32 are pivoted, so that the work engaging members 32 will be oscillated to their work releasing positions. At the opposite end of elongated member 44 is provided a transverse pin 50 extending through and closely fitting a cylindrical transverse opening in this elongated member. The pin or transverse member 50 passes through a narrow arcuate slot in the spindle 14 and its outer ends extend within diametrically opposite triangularly formed openings in an axially movable member 52 surrounding the spindle 14. Movement axially of this member 52, provided with the triangular openings 54, will effect relative angular or rotational movements between the elongated member 44 and the spindle 14 by engagement of the outer ends of the transverse pin 50 with the oblique surface of the triangular openings in the member 52. This movement by means of the splines 46 at the chuck end of the rod will oscillate the actuating or driving member 36 of the chuck relative to the body member 22 and move the work engaging members 32 to their open or work releasing positions. In order to effect this relative angular movement, the axially movable member 52 on the spindle 14 is attached by any preferred means to a rotatably mounted grooved member 56 mounted on an anti-friction bearing. The groove of the member 56 is engaged for a portion of its periphery by a projection 58 on a cam moved actuating or slidable member 60 guided suitably upon an elongated shaft 62. The axially movable member 52 is splined to the spindle 14 as by key 66 so that it may be reciprocated thereon but will rotate with the spindle 14.

In order to move the slidable member 60 axially to move the member 52 along the spindle 14 in directions to effect relative angular movement between the elongated member 44 and the spindle 14, a lever 64 is provided abutting against one end thereof. This lever may be actuated by any preferred means, manually or by power. By adjustment of a threaded member 68 extending from member 60 the axial positions to which the member 60 will be moved by the lever 64 may be varied. Also normally a spring 70 engaging one face of the member 60 will force that member toward one end of its movement.

I claim:

1. A work driver for machine tools having a rotating spindle, said driver comprising a body member rotatable with said spindle, a sleeve surrounding said body member and rotatable relative to said spindle and body member, work engaging members movable into and out of work engaging positions by relative rotation of said body member and sleeve, a rod extending axially of said spindle and connected to said sleeve, a member slidably mounted on said spindle, and cam means connecting said rod and slidable member, whereby movement of said slidable member effects rotational movement of said rod and rotates said sleeve relative to said body member to move said work engaging members into work releasing position.

2. A work driver for machine tools having a rotating spindle, said driver comprising a body member rotatable with said spindle, a sleeve surrounding said body member and rotatable relative to said spindle and body member, work engaging members movable into and out of work engaging position by relative rotation of said body member and sleeve, spring means normally holding said work engaging members toward their work engaging positions, a rod extending axially within said spindle and connected to said sleeve so that rotative movement of said rod relative to said spindle will rotate said sleeve relative to said body member, a member slidably mounted on said spindle and connected to said rod, whereby axial movement of said slidable member will effect rotational movement of said rod and rotate said sleeve relative to said body member to move said work engaging members into work releasing position.

3. A work driver for machine tools having a rotating spindle, said driver comprising a body member rotatable with said spindle, a sleeve surrounding said body member and rotatable relative to said spindle and body member, work engaging members movable into and out of work engaging position by relative rotation of said body member and sleeve, spring means normally holding said work engaging members in work engaging positions, a rod extending axially of said spindle and connected to said sleeve, a member slidably and non-rotatably mounted on said spindle, and cam means on said slidable member engaging a pin mounted transversely within said spindle, whereby rotational movement of said rod rotates said sleeve relative to said body member and moves said work engaging members into work releasing position.

HENRY E. DURKEE.

REFERENCES CITED

The following references are of record in the file of this patent:

UNITED STATES PATENTS

| Number | Name | Date |
|---|---|---|
| 662,900 | Kummel | Nov. 27, 1900 |
| 952,149 | Smith | Mar. 15, 1910 |
| 1,843,073 | Wagner | Jan. 26, 1932 |

FOREIGN PATENTS

| Number | Country | Date |
|---|---|---|
| 538,367 | Great Britain | July 31, 1941 |